United States Patent [19]

Curry

[11] 4,380,318
[45] Apr. 19, 1983

[54] VARIABLE PRESSURE, CONSTANT FLOW DRIP EMITTER SYSTEM AND HEAD

[76] Inventor: Byron V. Curry, 1150 Oriole Rd., Santa Barbara, Calif. 93108

[21] Appl. No.: 167,035

[22] Filed: Jul. 9, 1980

[51] Int. Cl.³ .............................................. B05B 1/30
[52] U.S. Cl. ................................ 239/533.13; 239/542; 239/562
[58] Field of Search ............ 239/271, 272, 452, 533.1, 239/533.13, 542, 547, 551, 562; 138/46

[56] References Cited

U.S. PATENT DOCUMENTS 3,719,327 3/1973 McMahan ........................... 239/542
3,797,755 3/1974 Saisho ................................ 239/547

Primary Examiner—John J. Love
Assistant Examiner—Paul A. Sobel
Attorney, Agent, or Firm—Allan Redrow

[57] ABSTRACT

A drip emitter system and head is disclosed, the system including a line through which water may pass, the line having a series of spaced openings. Drip emitter heads are received in these spaced openings, each head including a bulbous end received within the line, the end being larger than the opening, and a flared top external to the line. A shank connects the bulbous end and flared top of the head, at least a portion of the surface of the shank being tapered and narrowing from the bulbous end gradually towards the top, whereby increased pressure in the line increases the forces on the head, forcing the shank more firmly into the opening in the line and causing it to constrict water flow between the shank and the opening. The surface of the shank may be substantially circular in cross section, or may include one or more longitudinal grooves for water. The undersurface of the head may be oriented generally parallel to the surface of the line so that emitted water will strike it and spray outwardly.

11 Claims, 5 Drawing Figures

VARIABLE PRESSURE, CONSTANT FLOW DRIP EMITTER SYSTEM AND HEAD

BACKGROUND OF THE INVENTION

A great many drip emitter systems have been designed, develop and patented. They find wide commercial acceptance, especially by plant growers in areas of limited water supply, since they can be designed to deliver to each plant adequate water with minimal waste. However, such systems are plaqued by a variety of problems. For example, variations in the pressure of the water supplied to the drip emitter heads usually causes substantial variations in the amount of water delivered to the plant. This, in turn, has a significant practical effect. Since the tubing used to deliver the water to the plant increases in price as it increases in size, it is desirable economically to use relatively small diameter tubing. However, because internal frictional losses are significant for such tubing, even at low pressures, the pressure at the inlet end of the water line which includes the emitters, that is, the end of the tubing adjacent the water manifold, will be significantly higher than the pressure at the far end of the line. Since the water delivered by prior drip emitters varies with water pressure, plants adjacent the inlet end of the line will receive substantially more water than plants adjacent the far end. While it would be very desirable to provide a drip emitter that delivered the same water at the same rate regardless of internal water pressure, insofar as is known to the inventor, before the emitter and system herein described no such structure had been developed. Further, since the per acre cost of a drip emitter system is quite significant, it is very desirable to simplify the emitter structure as much as possible, consistent with its operational objectives. Also, it is very desirable to provide an emitter structure that is relatively uneffected by sediment and debris in the water. Some prior emitter systems have incorporated a self-cleaning feature. However, their per unit cost is quite substantial. In addition, since the emitter system is taken up while the field is being prepared for the next crop, it would be very desirable to achieve an emitter system that could be easily coiled for compact storage, and then subsequently reinstalled without requiring considerable fiddling and adjustment to render it again usable.

The present invention has, as primary objectives, the provision of a drip emitter head and system that is simple and of relatively low cost, one that will emit a substantially constant volume of water over a wide variation in internal water pressure, one which is self-cleaning if desired, and one which can be coiled, stored and reinstalled without much adjustment to render it operative. These and other objects of the invention will appear to one skilled in this art from the following description of preferred embodiments.

BRIEF SUMMARY OF THE INVENTION

The disclosed drip emitter system includes a line through which water may pass, the line having a series of spaced openings. A drip emitter head is located in each spaced opening of the line, each head including a bulbous end received within the line and larger than the opening, a flared top external of the line, and a shank connecting the end and top. At least a portion of the shank surface tapers or narrows from the bulbous end gradually toward the top, whereby increasing pressure in the line increases the force on the head, forcing it more firmly into the opening and further constricting the flow of water through the emitter to maintain a substantially constant emission rate over a range of water pressures.

Preferably, the portion of the line about the head is resilient and somewhat deformable in response to pressure, to better seal against the shank of the head as the pressure within the line increases. This system advantageously may include means to occasionally reduce the pressure within the line to a sub-atmospheric pressure, thereby forcing the heads into the openings to release any debris that may be clogging the space between the shank and the line opening. The shank portion of the head may be circular in cross-section, or may include one or more longitudinal grooves through which water may flow. The top of the head may include an under-surface against which emitted water strikes, this under-surface being generally parallel to the surface of the line, the water striking this under-surface both spraying outwardly from the head and causing the head to seat more firmly within the opening in the line. Also disclosed, of course, are preferred drip emitter heads; a variety of other heads also are suggested.

BRIEF DESCRIPTION OF THE DRAWING

The invention will be further described in connection with the accompanying drawing in which.

DETAILED DESCRIPTION

The invention, in its most basic sense, consists of certain design features and operational principles which are described hereafter in connection with preferred embodiments of the invention. Of course, others skilled in this field will readily recognize these principles and objectives, and can easily adapt them to suit a variety of systems and structures. Accordingly, while preferred embodiments of the invention are described, the teachings they present to those skilled in this field are, in essence, the invention.

Figure 1:
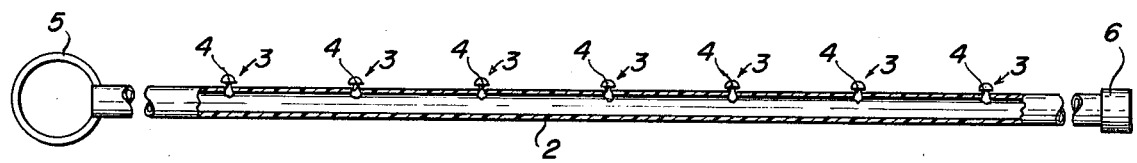
FIG. 1 is a view in vertical cross section of a drip emitter system constructed in accordance with the principles of the present invention.

In FIG. 1, as illustrated in vertical cross-section a water supply line 2 has a series of drip emitter heads 3 received in openings 4 spaced along its length. This water line extends from a water manifold 5, along a row of plants to be irrigated, the line being closed its far end by caps 6 (or crimped). Water flows down the line under pressure and is emitted by each head structure to irrigate an adjacent plant.

Figure 2:
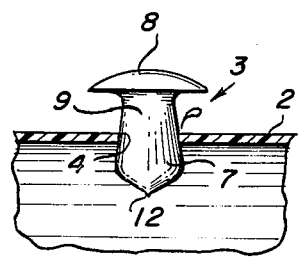
FIG. 2 is a view in partial section of one embodiment of a preferred drip emitter.

The construction of the head structure is illustrated in FIG. 2. The head 3 includes a bulbous inner end 7, a top 8, and a shank area 9 connecting the bulbous inner end to the top. This shank is tapered, narrowing from the bulbous end to terminate at the inner surface of the head. Water flowing through line 2 under pressure exerts a pressure upon the bulbous end 7 of the head and, if sufficient, also upon the under-surface of top 8, forcing the head further into the opening 4 which receives the emitter head. At least the portion of line 2 about opening 4 is resilient, permitting the head to move more snuggly into this opening in response to increasing internal water pressure within the line. Thus, as the water within the line increases, the space between head 3 and opening 4 decreases. The decreasing space thereby compensates for the increasing water pressure to maintain substantially uniform over a range of pressures. The volume of emitted water.

Figure 3:
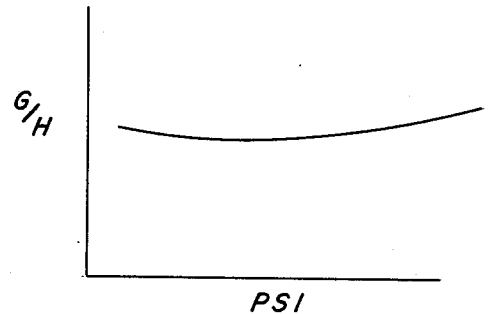
FIG. 3 is a graph illustrating the variation in water emitted by the preferred system in response to increasing water pressure.

The relative constancy of water emitted over a substantial range of pressures is generally by the graph presented in FIG. 3. It shows that for a range of pressures, indicated by PSI (per square inch), the gallons per hour (G/H) of water emitted past the head is substantially constant. Of course, by adjusting the configuration of the head and of the area in the line defining the opening, this variation in emitted water may be adjusted to provide most any desired response.

As indicated in FIG. 2, preferably the bulbous end 7 of the head includes a tapered, pointed tip 12, permitting it to be forced through opening 4 without substantial difficulty. Also, preferably the outer surface of top 8 is wide, both to prevent the top from being forced through opening 12 and to provide a substantial bearing surface to permit the installer to force the bulbous end 7 through opening 4 by simple thumb pressure applied to top 8. Also, by gripping the under surface of the top, the installer may remove the emitter head if desired and close opening 4 by a threaded screw or other appropriate structure to reseal the line, should water at that particular area of the line no longer be desired.

In use of this system, because of the substantial uniformity of water emitted over a range of internal water pressures, the line may be run long distances, even the entire length of the field, the plants at the far end receiving very nearly the same amount of water as those adjacent the water manifold. To install a head in the line it is only necessary to perforate the line and form opening 4, then force a head through the opening. Forming the opening easily may be accomplished by a drill, hot iron, or other appropriate means, such as a laser beam.

To remove the line when it is desired to rework the field, because of the simplicity and compactness of the emitter structures, the line simply may be coiled upon a drum, or by hand, and layed aside or stored for further use. After the field has been reworked, the line may be uncoiled and pressurized to recommence its use. From time to time, because of debris in the water, or external debris surrounding the line, the opening between the head and the water line may become partially or totally clogged. Again, because of the simplicity of the structure, such clogging may be eliminated simply by varying the pressure in the line, reducing the pressure to a subatmospheric pressure to cause heads 3 to be pulled down onto the line, then by internally pressurizing the line to raise up again. As the water floods between the heads and the opening in which the heads are received, it flushes these openings of debris. Simply by repeating this process a few times occasionally, all the emitters may be cleared and restored to proper operation, even if clogged by considerable debris.

Figure 4:
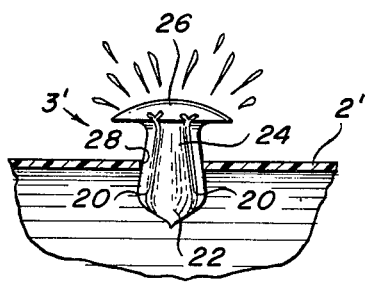
FIG. 4 is a view similar to FIG. 2 of another preferred emitter head.
Figure 5:
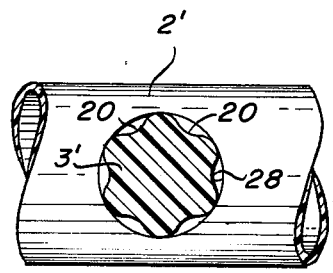
FIG. 5 is a view in horizontal cross section of an emitter similar to that shown in FIG. 4.

For some applications it is desirable to emit a low volume of water. The emitter head illustrated in FIG. 2 is suitable for such applications. In other applications, it is desirable to emit a higher volume of water, preferably as a spray. This may be accomplished by the head structure illustrated in FIG. 4. This emitter head 3' includes one or more longitudinal grooves 20 extending from the bulbous end 22, along shank area 24, to adjacent top 26. Water flows along these grooves and past opening 28 in line 2'. The underside of top 26 may be flattened, serrated or otherwise appropriately shaped as illustrated to direct this volume of water flowing along grooves 20 outwardly as a lateral spray from line 2'. By appropriately shaping these grooves, as illustrated in FIG. 5, as gentle depressions rather than as deep notches, and by employing a water line 2' with an area that is relatively resilient around opening 28, a relatively uniform volume of sprayed water may be achieved over a substantial range of internal pressures, the pressures in the bulbous end and the underside of the top forcing head 3' into opening 28 more completely as the internal water pressure increases, opening 28 thereby conforming more and more closely to the shape of grooves 20 and further constricting the flow of water along them.

While preferred embodiments of the invention have been illustrated and described, as has been noted the teachings presented in this disclosure will enable others skilled in this field to design different structures incorporating the features and advantages herein disclosed. Accordingly, the scope of the invention is not defined by the foregoing disclosure, but rather by the following claims.

I claim the right to exclude others from making, using, and selling:

1. A drip emitter system including a line through which water may pass, the line having at least one opening, and; a drip emitter head received in the opening in the line, the head including a bulbous end received within, and larger than, the opening in the line, a flared top external of the line, and a shank portion connecting the end and the top, at least a portion of the shank tapering inwardly from the bulbous end gradually towards the top, whereby an increase in water pressure within the line forces the head more firmly into the opening, and the tapering shank gradually moves upwardly in the line to effect a throttling action to constrict the water flow past the bulbous head in proportion to the increase in water pressure to proportionally offset any increase in water flow that would be caused by such pressure increase.

2. A drip emitter system as set forth in claim 1 in which the portion of the line about the opening receiving the head is somewhat deformable in response to pressure to tend to seal against the head as pressure within the line increases.

3. A drip emitter system as set forth in claim 1 in which the shank of the head is circular in cross section.

4. A drip emitter system as set forth in claim 1 in which the shank of the head includes at least one longitudinal groove, increasing the space between the opening and the shank through which water may flow.

5. A drip emitter system as set forth in claim 1 which the top of the head includes an under-surface against which emitted water may strike, whereby increases in pressure within the line increases the pressure on the under-surface, in turn seating the head more firmly in the opening.

6. A drip emitter system as set forth in claim 5 which the shank of the head includes at least one longitudinal groove, increasing the space between the opening and the shank through which water may flow.

7. A drip emitter system as set forth in claim 1 in which the line has a plurality of spaced openings, a drip emitter head being received in each spaced opening.

8. A drip emitter system as set forth in claim 7 in which the portion of the line about the opening receiving the head is somewhat deformable in response to pressure to tend to seal against the head as pressure within the line increases.

9. A head for a drip emitter system, including a line through which water may pass, the line including a series of spaced openings, each opening receiving a head, the head including:
- a bulbous end for being received within the line,
- a flared top for being positioned external of the line, and
- a shank connecting the bulbous end and the top, at least a portion of the shank surface tapering from the bulbous end gradually slopes inwardly and then outwardly towards the top, whereby increases in pressure within the line force the head to move upwardly in the line to engage more firmly into the opening in the line to throttle and constrict the water flow.

10. A head for a drip emitter system as set forth in claim 9 in which the body of the head includes at least one longitudinal groove.

11. A head for a drip emitter system as set forth in claim 9 in which the top of the head includes an undersurface against which emitted water may strike, whereby increases in pressure within the line increases the pressure on the undersurface, in turn seating the head more firmly in the opening.

* * * * *